United States Patent
Chouvel

(10) Patent No.: US 11,359,077 B2
(45) Date of Patent: *Jun. 14, 2022

(54) TIRE PROVIDED WITH AN OUTER SIDEWALL COMPRISING ONE OR MORE THERMOPLASTIC ELASTOMERS AND ONE OR MORE SYNTHETIC DIENE ELASTOMERS

(71) Applicant: COMPAGNIE GENERALE DES ETABLISSEMENTS MICHELIN, Clermont-Ferrand (FR)

(72) Inventor: Christophe Chouvel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 129 days.

This patent is subject to a terminal disclaimer.

(21) Appl. No.: 16/465,654

(22) PCT Filed: Nov. 30, 2017

(86) PCT No.: PCT/EP2017/081014
§ 371 (c)(1),
(2) Date: May 31, 2019

(87) PCT Pub. No.: WO2018/100079
PCT Pub. Date: Jun. 7, 2018

(65) Prior Publication Data
US 2019/0300684 A1 Oct. 3, 2019

(30) Foreign Application Priority Data
Dec. 2, 2016 (FR) ..................... 1661876

(51) Int. Cl.
| | |
|---|---|
| *B60C 1/00* | (2006.01) |
| *C08L 53/02* | (2006.01) |
| *C08L 9/00* | (2006.01) |
| *C08L 9/06* | (2006.01) |
| *C08K 3/04* | (2006.01) |
| *C08K 3/06* | (2006.01) |
| *C08K 3/22* | (2006.01) |
| *C08K 3/36* | (2006.01) |
| *C08K 5/09* | (2006.01) |
| *C08K 5/47* | (2006.01) |
| *C08L 7/00* | (2006.01) |
| *C08L 91/00* | (2006.01) |

(52) U.S. Cl.
CPC .............. *C08L 9/06* (2013.01); *B60C 1/0025* (2013.01); *C08K 3/04* (2013.01); *C08K 3/06* (2013.01); *C08K 3/22* (2013.01); *C08K 3/36* (2013.01); *C08K 5/09* (2013.01); *C08K 5/47* (2013.01); *C08L 7/00* (2013.01); *C08L 9/00* (2013.01); *C08L 53/02* (2013.01); *C08L 91/00* (2013.01); *C08K 2003/2296* (2013.01)

(58) Field of Classification Search
CPC ...... C08L 9/00; C08L 9/06; C08L 7/00; C08L 53/00; C08L 53/02; B60C 1/0025
See application file for complete search history.

(56) References Cited

U.S. PATENT DOCUMENTS

| | | |
|---|---|---|
| 3,464,477 A | 9/1969 | Verdier |
| 4,824,900 A | 4/1989 | Sakurai |
| 4,946,899 A | 8/1990 | Kennedy et al. |
| 5,977,238 A | 11/1999 | Labauze |
| 6,013,718 A | 1/2000 | Cabioch et al. |
| 6,075,084 A | 6/2000 | Mabry et al. |
| 6,503,973 B2 | 1/2003 | Robert et al. |
| 6,598,632 B1 | 7/2003 | Moreland et al. |
| 6,598,637 B2 | 7/2003 | Lechtenbohmer et al. |
| 6,666,248 B2 | 12/2003 | Omoto et al. |
| 6,774,255 B1 | 8/2004 | Tardivat et al. |
| 6,815,473 B2 | 11/2004 | Robert et al. |
| 6,849,754 B2 | 2/2005 | Deschler et al. |
| 7,217,751 B2 | 5/2007 | Durel et al. |
| 7,250,463 B2 | 7/2007 | Durel et al. |
| 7,312,264 B2 | 12/2007 | Gandon-Pain |

(Continued)

FOREIGN PATENT DOCUMENTS

| | | |
|---|---|---|
| CN | 103517812 A | 1/2014 |
| EP | 1097966 A1 | 5/2001 |
| EP | 1127909 A1 | 8/2001 |
| EP | 1231080 A1 | 8/2002 |
| EP | 1270273 A1 | 1/2003 |
| EP | 1357149 A2 | 10/2003 |

(Continued)

OTHER PUBLICATIONS

E. Camano et al., "Evaluation of the Thermal Diffusivity of Rubber Compounds Through the Glass Transition Range", Journal of Applied Polymer Science, vol. 63, No. 2, pp. 157-162 (1997).
J.E. Puskas, et al., "Polyisobutylene-Containing Block Polymers by Sequential Monomer Addition", J Polymer Sci.: Part A, vol. 30, pp. 41-48 (1992).
Zs. Fodor, et al., "Polyisobutylene-containing block polymers by sequential monomer addition", Polymer Bull, vol. 29, pp. 697-704 (1992).
G. Kaszas, et al., "New Thermoplastic Elastomers of Rubbery Polyisobutylene and Glassy Cyclopolyisoprene Segments", J. Appl. Polymer Sci., vol. 39, pp. 119-144 (1990).

(Continued)

*Primary Examiner* — Irina S Zemel
*Assistant Examiner* — Jeffrey S Lenihan
(74) *Attorney, Agent, or Firm* — Venable LLP

(57) ABSTRACT

A tire has an outer sidewall, said outer sidewall comprising at least one composition based on an elastomeric matrix comprising: one or more thermoplastic elastomers comprising at least one elastomer block and at least one thermoplastic block, the elastomer block(s) not denoting one or more polyisobutylene blocks; and one or more synthetic diene elastomers selected from butadiene polymers having a glass transition temperature of less than or equal to $-50°$ C.; said composition comprising at least one crosslinking system and one or more reinforcing fillers.

12 Claims, No Drawings

(56) References Cited

U.S. PATENT DOCUMENTS

| | | |
|---|---|---|
| 7,335,692 B2 | 2/2008 | Vasseur et al. |
| 7,488,768 B2 | 2/2009 | Tardivat et al. |
| 7,510,670 B2 | 3/2009 | Chaves et al. |
| 7,649,043 B2 | 1/2010 | Bergman |
| 7,820,771 B2 | 10/2010 | Lapra et al. |
| 8,461,269 B2 | 6/2013 | Varagniat et al. |
| 8,492,475 B2 | 7/2013 | Araujo Da Silva et al. |
| 8,883,929 B2 | 11/2014 | Gandon-Pain et al. |
| 8,957,155 B2 | 2/2015 | Seeboth et al. |
| 9,010,393 B2 | 4/2015 | Araujo Da Silva et al. |
| 9,403,406 B2 | 8/2016 | Custodero et al. |
| 9,849,727 B2 | 12/2017 | Abad et al. |
| 10,471,775 B2 | 11/2019 | Fugier et al. |
| 10,550,247 B2 | 2/2020 | Tokimune et al. |
| 2001/0036991 A1 | 11/2001 | Robert et al. |
| 2002/0016404 A1 | 2/2002 | Mabry et al. |
| 2002/0037962 A1 | 3/2002 | Lechtenbohmer et al. |
| 2002/0183436 A1 | 12/2002 | Robert et al. |
| 2003/0005993 A1 | 1/2003 | Omoto et al. |
| 2004/0051210 A1 | 3/2004 | Tardivat et al. |
| 2004/0127617 A1 | 7/2004 | Masseur et al. |
| 2004/0132880 A1 | 7/2004 | Durel et al. |
| 2005/0004297 A1 | 1/2005 | Durel et al. |
| 2006/0089445 A1 | 4/2006 | Gandon-Pain |
| 2007/0161735 A1 | 7/2007 | Bergman |
| 2007/0228322 A1 | 10/2007 | Chaves et al. |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0145089 A1 | 6/2010 | Mignani et al. |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |
| 2012/0208948 A1 | 8/2012 | Gandon-Pain et al. |
| 2013/0116376 A1* | 5/2013 | Custodero ............. C08L 9/00 524/526 |
| 2013/0299053 A1 | 11/2013 | Fugier et al. |
| 2014/0076473 A1 | 3/2014 | Abad et al. |
| 2014/0083589 A1 | 3/2014 | Abad et al. |
| 2014/0299249 A1 | 10/2014 | Custodero et al. |
| 2015/0034226 A1 | 2/2015 | Abad et al. |
| 2015/0034230 A1 | 2/2015 | Abad et al. |
| 2016/0130426 A1 | 5/2016 | Miyazaki et al. |
| 2016/0339743 A1 | 11/2016 | Abad et al. |
| 2016/0347121 A1 | 12/2016 | Greiveldinger et al. |
| 2017/0151842 A1 | 6/2017 | Custodero et al. |
| 2017/0151843 A1 | 6/2017 | Custodero et al. |
| 2017/0313130 A1 | 11/2017 | Chouvel et al. |
| 2018/0043734 A1 | 2/2018 | Greiveldinger et al. |
| 2018/0178584 A1 | 6/2018 | Chouvel |
| 2018/0258260 A1 | 9/2018 | Tokimune et al. |
| 2019/0144646 A1* | 5/2019 | Miura .................... C08L 9/00 524/505 |
| 2019/0300640 A1 | 10/2019 | Custodero et al. |
| 2020/0392311 A1 | 12/2020 | Chouvel et al. |
| 2021/0214530 A1 | 7/2021 | Chouvel et al. |

FOREIGN PATENT DOCUMENTS

| | | |
|---|---|---|
| EP | 1462479 A1 | 9/2004 |
| EP | 1033265 A2 | 9/2009 |
| EP | 2716700 A1 * | 4/2014 |
| EP | 3216827 A1 | 9/2017 |
| FR | 1502689 | 11/1967 |
| FR | 2740778 A1 | 5/1997 |
| FR | 2765882 A1 | 1/1999 |
| WO | 97/36724 A2 | 10/1997 |
| WO | 99/09036 A1 | 2/1999 |
| WO | 99/16600 A1 | 4/1999 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/016387 A1 | 2/2003 |
| WO | 2004/096865 A2 | 11/2004 |
| WO | 2006/023815 A1 | 3/2006 |
| WO | 2006/047509 A2 | 5/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006125534 A1 | 11/2006 |
| WO | 2007061550 A1 | 5/2007 |
| WO | 2007/098080 A2 | 8/2007 |
| WO | 2008/003434 A1 | 1/2008 |
| WO | 2008/003435 A1 | 1/2008 |
| WO | 2008/055986 A2 | 5/2008 |
| WO | 2010/072685 A1 | 7/2010 |
| WO | 2012/076456 A1 | 6/2012 |
| WO | 2013/087485 A1 | 6/2013 |
| WO | 2017/093687 A1 | 6/2017 |

OTHER PUBLICATIONS

J.E. Puskas, et al., "New Transparent Flexible UV-Cured Films from Polyisobutylene-Polyisoprene Block Polymers", J. Macromol. Sci., vol. A28(1), pp. 65-80 (1991).

R. Mildenburg, et al., "Hydrocarbon Resins", VCH, New York, chapter 5.5, pp. 141-146 (1997).

J.P. Kennedy, et al., "Polyisobutylene-Containing Block Copolymers by Sequential Monomer Addition", Macromolecules, vol. 24, pp. 6572-6577 (1991).

International Search Report dated Feb. 27, 2018, in corresponding PCT/EP2017/081014 (6 pages).

S. Brunauer, et al., "Adsorption of Gases in Multimolecular Layers", J. Am. Chem. Soc., vol. 60, pp. 309-319 (1938).

* cited by examiner

TIRE PROVIDED WITH AN OUTER SIDEWALL COMPRISING ONE OR MORE THERMOPLASTIC ELASTOMERS AND ONE OR MORE SYNTHETIC DIENE ELASTOMERS

BACKGROUND

The present invention relates to tyres and more particularly to tyre outer sidewalls, that is to say, by definition, to the elastomeric layers located radially on the outside of the tyre, which are in contact with the ambient air.

It is possible to define, within the tyre, three types of regions:
- The radially exterior region in contact with the ambient air, this region essentially consisting of the tread and of the outer sidewall of the tyre. An outer sidewall is an elastomeric layer positioned outside the carcass reinforcement with respect to the internal cavity of the tyre, between the crown and the bead, so as to completely or partially cover the region of the carcass reinforcement extending from the crown to the bead.
- The radially interior region in contact with the inflation gas, this region generally consisting of the layer airtight to the inflation gas, sometimes referred to as inner liner.
- The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The outer sidewall can, depending on the requirements, comprise one or more protective plies, located on the outside with respect to the carcass reinforcement, the role of which protective plies is to protect the rest of the structure of the sidewall from external attacks: impacts, tears or other perforations.

This is, for example, the case in the sidewalls of certains tyres intended for rolling over relatively rough ground, for example on rally-type passenger vehicles or else on industrial off-road vehicles of the construction site type.

These protective plies must be sufficiently flexible and deformable so as, on the one hand, to follow as closely as possible the shape of the obstacle on which the sidewall is liable to bear during rolling and, on the other hand, to prevent the possible penetration of foreign bodies towards the inside of said sidewall. To meet such criteria generally requires the use, in these protective plies or layers, of reinforcing threads in the form of elastic metal-strand cords combining a high elasticity and a high breaking energy.

Such metallic protective plies for tyre sidewalls are well known, they have been described, for example, in Patents or Patent Applications FR 1 502 689 (or U.S. Pat. No. 3,464, 477), EP 1 270 273 (or US 2003/0005993).

However, they exhibit a certain number of disadvantages. Besides the fact that they consequently make the sidewalls of the tyres heavier, they are formed from strand cords which are relatively expensive, on two accounts: first, they are prepared in two steps, namely by prior manufacture of the strands, followed by assembling these strands by twisting; secondly, they generally require a high twist of their wires (i.e., very short helical pitches), a twist which is admittedly essential in order to confer on them the desired elasticity but which involves reduced manufacturing rates. This disadvantage, of course, has repercussions for the cost of the tyres themselves.

Consequently, such modifications to the outer sidewall are not applicable to tyres intended for passenger vehicles.

Nevertheless, there is a high demand from users to have available tyres, in particular tyres intended for passenger vehicles, which comprise sidewalls resistant to external attacks, such as impacts, tears or perforations. This involves, in particular, contacts between the tyre and a pavement, which can seriously damage, indeed even perforate, the tyre.

Moreover, tyre outer walls generally comprise a rubber composition comprising natural rubber. Nevertheless, it is known to those skilled in the art that the resistance to cracking of compositions comprising for example a natural rubber/polybutadiene blend is not optimal.

There thus exists a need to develop a tyre outer sidewall which is more resistant to outside attacks.

Furthermore, the outer sidewall generally consists of a rubber composition comprising predominantly diene elastomers, for example a blend of natural rubber and polybutadiene. In a known manner, this composition also comprises at least one anti-ozonant intended to reduce the formation and propagation of cracks under prolonged static and dynamic stresses in the presence of ozone, and also waxes, intended to form a protective coating at the surface of the sidewalls so as to provide additional protection under static stresses.

The combination of these anti-ozonants and these waxes has proved effective in minimizing cracks at the sidewall surface. Unfortunately, the most effective anti-ozonants are also characterized by a very strong ability to migrate through the elastomer substrate and to mark and turn yellow or brown the outer faces of the sidewalls. This phenomenon, known as "staining" (or "blooming"), can also occur when these anti-ozonants and waxes are present in relatively high contents.

There is therefore also a need to minimize this phenomenon, in particular without being detrimental to the other properties of the outer sidewall.

Moreover, document WO 2013/087485 describes a tyre having an outer sidewall, said outer sidewall comprising at least one rubber composition comprising at least one or more diene elastomers and one or more thermoplastic elastomers comprising a polyisobutylene block. It is also indicated that such a tyre exhibits improved airtightness. The objective of said document is thus not linked to the solving of a problem linked to the resistance to outside attacks or to a need to minimize the "staining" phenomenon.

SUMMARY

Thus, a subject of the invention is a tyre having an outer sidewall, said outer sidewall comprising at least one composition based on an elastomeric matrix comprising:
- one or more thermoplastic elastomers comprising at least one elastomer block and at least one thermoplastic block, the elastomer block(s) not denoting one or more polyisobutylene blocks; and
- one or more synthetic diene elastomers selected from butadiene polymers having a glass transition temperature of less than or equal to $-50°$ C.;
- said composition comprising at least one crosslinking system and one or more reinforcing fillers.

The tyre according to the invention comprising the outer sidewall makes it possible to cause the outside attacker "to slide" over the sidewall and in particular prevents the penetration into the sidewall of an outside attacker or at least minimizes the depth to which the sidewall is attacked during the rubbing of the latter over the outside attacker.

Furthermore, this outer sidewall does not necessarily comprise protection by metal and it is consequently easier and faster to prepare. Thus, the cost prices of the tyre according to the invention are reduced, in comparison with tyres comprising sidewalls comprising protection by metal.

Finally, in the case where the outer sidewall does not comprise protection by metal, it is more flexible, which improves the perception of comfort for the user, in comparison with a sidewall comprising protection by metal.

Another subject of the invention is a process for producing a composition for the manufacture of tyres as defined above, comprising the following steps:

incorporating the reinforcing filler(s) into the elastomeric matrix during a first step, everything being kneaded thermomechanically, in one or more goes, until a maximum temperature Ti of between 110° C. and 190° C. is reached, then subsequently incorporating the crosslinking system, during a second step, and kneading everything to a maximum temperature of less than 90° C.

The invention and its advantages will be easily understood in the light of the description and the exemplary embodiments that follow.

DETAILED DESCRIPTION

In the present description, unless expressly indicated otherwise, all the percentages (%) indicated are percentages by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, the term "parts per hundred parts of elastomer" or "phr" is intended to mean the part by weight of a constituent per 100 parts by weight of the elastomer(s), i.e. of the total weight of the elastomer(s), whether they are thermoplastic or non-thermoplastic, in the elastomeric matrix. Thus, a constituent at 60 phr will mean, for example, 60 g of this constituent per 100 g of elastomer.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention may be different in the non-crosslinked state and in the crosslinked state.

For the purpose of the present invention, the term "polyisobutylene block" should be understood to mean a block predominantly composed of the polymerized isobutylene monomer. Predominantly is understood to mean a content by weight of monomer, relative to the total weight of the "polyisobutylene" block, which is the highest and preferably a content by weight of more than 50%, more preferably of more than 75% and for example of more than 85%.

In the present application, the term "elastomeric matrix" denotes all of the elastomers of the composition.

The term "thermoplastic elastomer (TPE)" is intended to mean, in a known manner, a polymer with a structure that is intermediate between a thermoplastic polymer and an elastomer.

A thermoplastic elastomer consists of one or more rigid "thermoplastic" segments connected to one or more flexible "elastomer" segments.

Thus, the thermoplastic elastomer(s) of the outer sidewall composition that can be used according to the invention comprise at least one elastomer block and at least one thermoplastic block.

Typically, each of these segments or blocks contains a minimum of more than 5, generally of more than 10, base units.

Thus, a composition in which a resin or a thermoplastic polymer and an elastomer are mixed does not constitute a thermoplastic elastomer for the purposes of the present invention.

In the present application, when reference is made to the glass transition temperature of a thermoplastic elastomer, it is the glass transition temperature relating to the elastomer block (unless otherwise indicated). Indeed, in a known manner, thermoplastic elastomers have two glass transition temperature peaks (Tg, measured according to ASTM D3418), the lowest temperature being related to the elastomer part of the thermoplastic elastomer and the highest temperature being related to the thermoplastic part of the thermoplastic elastomer. Thus, the flexible blocks of the thermoplastic elastomers are generally defined by a Tg below or equal to ambient temperature (25° C.), whilst the rigid blocks have a Tg above or equal to 80° C. In order to be of both elastomeric and thermoplastic nature, the thermoplastic elastomer must be provided with blocks that are sufficiently incompatible (that is to say different due to their respective weight, their respective polarity or their respective Tg) in order to retain their characteristic elastomer block or thermoplastic block properties.

Preferentially, the thermoplastic elastomer(s) that can be used according to the invention (thus the elastomer block(s) of the thermoplastic elastomers) have a glass transition temperature which is less than or equal to −50° C.

Also preferentially, the glass transition temperature of the thermoplastic elastomers that can be used according to the invention is greater than −100° C.

The number-average molecular weight (denoted by Mn) of the thermoplastic elastomers is preferentially between 30 000 and 500 000 g/mol, more preferentially between 40 000 and 400 000 g/mol, even more preferentially between 50 000 g/mol and 300 000 g/mol. Below the minima indicated, there is a risk of the cohesion between the elastomer chains of the thermoplastic elastomers being affected, in particular due to their possible dilution (in the presence of an extender oil); furthermore, there is a risk of an increase in the working temperature affecting the mechanical properties, in particular the properties at break, with the consequence of a reduced "hot" performance. Furthermore, an excessively high Mn weight can be detrimental to the implementation.

The number-average molecular weight (Mn) of the thermoplastic elastomers is determined in a known manner, by size exclusion chromatography (SEC). The sample is first dissolved in a suitable solvent at a concentration of about 2 g/l and then the solution is filtered on a filter with a porosity of 0.45 μm before injection. The apparatus used is a Waters Alliance chromatographic line. The injected volume of the solution of the polymer sample is 100 μl. The detector is a Waters 2410 differential refractometer and its associated software, for making use of the chromatographic data, is the Empower system. The conditions can be adjusted by those skilled in the art. For example, in the case of TPEs of COPE type, the elution solvent is hexafluoroisopropanol with sodium trifluoroactetate salt at a concentration of 0.02M, the flow rate is 0.5 ml/min, the temperature of the system is 35° C. and the analysis time is 90 min. Use is made of a set of three PHENOMENEX columns in series, with "PHENOGEL" trade names (pore size: $10^5$, $10^4$, $10^3$ A). For example, in the case of styrene thermoplastic elastomers, the sample is first dissolved in tetrahydrofuran at a concentration of approximately 1 g/l and then the solution is filtered on a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analysis time is 90 min. A set of four Waters Styragel columns (an HMW7 column, an HMW6E column and two HT6E columns) are used in series. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

The polydispersity index (PI=Mw/Mn, with Mw the weight-average molecular weight) of the thermoplastic elastomer(s) is preferably less than 3; more preferentially less than 2 and more preferentially still less than 1.5.

The thermoplastic elastomers that can be used according to the invention may be copolymers with a small number of blocks (less than 5, typically 2 or 3), in which case these blocks preferably have high weights of greater than 15 000 g/mol.

The thermoplastic elastomers may also be copolymers with a large number of smaller blocks (more than 30, typically from 50 to 500), in which case these blocks preferably have relatively low weights, for example from 500 to 5000 g/mol; these thermoplastic elastomers will subsequently be referred to as multiblock thermoplastic elastomers.

According to a first variant, the thermoplastic elastomers that can be used according to the invention are in a linear form.

In a first particular embodiment of this first variant, the thermoplastic elastomers are diblock copolymers: thermoplastic block/elastomer block.

In a second particular embodiment of this first variant, the thermoplastic elastomers are triblock copolymers: thermoplastic block/elastomer block/thermoplastic block, that is to say a central elastomer block and a terminal thermoplastic block at each of the two ends of the elastomer block.

In a third particular embodiment of this first variant, the thermoplastic elastomers are formed of a linear series of elastomer blocks and thermoplastic blocks (multiblock thermoplastic elastomers).

According to a second variant, the thermoplastic elastomers that can be used according to the invention are in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to a third variant, the thermoplastic elastomers that can be used according to the invention are in a branched or dendrimer form. The thermoplastic elastomers can then be composed of a branched or dendrimer elastomer block and of a thermoplastic block located at the end of the branches of the dendrimer elastomer block.

As previously explained, the thermoplastic elastomer(s) that can be used according to the invention comprise at least one elastomer block and at least one thermoplastic block, the elastomer block(s) not denoting one or more polyisobutylene blocks.

The elastomer blocks of the thermoplastic elastomers that can be used according to the invention may be any of the elastomers known to those skilled in the art, with the exception of the thermoplastic elastomers of which the elastomer block(s) denote one or more polyisobutylene blocks.

A distinction is generally made between saturated elastomer blocks and unsaturated elastomer blocks.

The term "saturated elastomer block" is intended to mean that this block essentially comprises moieties not comprising ethylenic unsaturations (that is to say carbon-carbon double bonds), that is to say that the moieties comprising ethylenic unsaturations represent less than 15 mol % relative to all of the moieties of the block in question.

The saturated elastomer blocks are generally formed by the polymerization of ethylene monomers. Mention may in particular be made of polyalkylene blocks, with the exception of polyisobutylene blocks, such as random ethylene/propylene or ethylene/butylene copolymers. These saturated elastomer blocks can also be obtained by hydrogenation of unsaturated elastomer blocks.

They can also be aliphatic blocks resulting from the family of the polyethers, polyesters or polycarbonates. In particular, the saturated elastomer blocks may especially be formed by polyethers, especially polytetramethylene glycol (PTMG), polyethylene glycols (PEGs).

According to one variant, the monomers polymerized in order to form a saturated elastomer block may be copolymerized, randomly, with at least one other monomer so as to form a saturated elastomer block. According to this variant, the molar fraction of polymerized monomer, other than an ethylene monomer, relative to the total number of moieties of the saturated elastomer block, has to be such that this block retains its saturated elastomer properties. Advantageously, the molar fraction of this other comonomer can range from 0 to 50%, more preferentially from 0 to 45% and more preferentially still from 0 to 40%.

For example, conjugated $C_4$-$C_{14}$ dienes may be copolymerized with the ethylenic monomers, the ethylenic moieties remaining predominant as seen above.

Preferably, these conjugated dienes are selected from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene and a mixture of these conjugated dienes, and preferably these conjugated dienes are selected from isoprene and a mixture of conjugated dienes containing isoprene.

The term "unsaturated elastomer block" is intended to mean that this block is at least partially derived from conjugated diene monomers, having a content of moieties or units of diene origin (conjugated dienes) which is greater than 15% mol %.

When the elastomer blocks of the thermoplastic elastomers that can be used according to the invention are unsaturated, they may be selected from:

a) any homopolymer obtained by polymerization of a conjugated diene monomer having from 4 to 12 carbon atoms;

b) any copolymer obtained by copolymerization of one or more conjugated dienes with one another or with one or more vinylaromatic compounds containing from 8 to 20 carbon atoms;

c) a ternary copolymer obtained by copolymerization of ethylene and an α-olefin having from 3 to 6 carbon atoms with an unconjugated diene monomer having from 6 to 12 carbon atoms, such as, for example, the elastomers obtained from ethylene and propylene with an unconjugated diene monomer of the abovementioned type, such as, especially, 1,4-hexadiene, ethylidenenorbornene or dicyclopentadiene;

d) a copolymer of isobutene and of isoprene (diene butyl rubber) and also the halogenated versions, in particular chlorinated or brominated versions, of this type of copolymer.

Conjugated dienes that are suitable are in particular isoprene, 1,3-butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1.3-cyclopentadiene, methylcyclopentadiene, 2-methyl-1,6-heptadiene, 1,3-cyclohexadiene, 1-vinyl-1,3-cyclohexadiene, and a mixture of these conjugated dienes, and preferably these conjugated dienes are selected from isoprene, butadiene and a mixture containing isoprene and/or butadiene.

According to one variant, the monomers polymerized in order to form an unsaturated elastomer block may be copolymerized, randomly, with at least one other monomer so as to form an unsaturated elastomer block. According to this variant, the molar fraction of polymerized monomer, other than a diene monomer, relative to the total number of moieties of the unsaturated elastomer block, has to be such that this block retains its unsaturated elastomer properties. Advantageously, the molar fraction of this other comonomer can range from 0 to 50%, more preferentially from 0 to 45% and more preferentially still from 0 to 40%.

By way of illustration, this other monomer capable of copolymerizing with the first monomer can be selected from ethylenic monomers, such as ethylene, propylene or butylene, monomers of vinylaromatic type having from 8 to 20 carbon atoms as defined above, or else it may be a monomer such as vinyl acetate.

Styrene monomers, namely methylstyrenes, para-(tert-butyl)styrene, chlorostyrenes, bromostyrenes, fluorostyrenes or else para-hydroxystyrene, are suitable in particular as vinylaromatic compounds. Preferably, the comonomer of vinylaromatic type is styrene.

Thus, according to one preferred embodiment, the at least one elastomer block may be a random copolymer of styrene-butadiene (SBR) type, it being possible for this copolymer to be partially hydrogenated. This SBR block preferably has a Tg (glass transition temperature) measured by DSC according to standard ASTM D3418 of 1999, of less than −50° C. In a well-known manner, the SBR block comprises a styrene content, a content of 1,2-bonds of the butadiene part and a content of 1,4-bonds of the butadiene part, the latter being composed of a content of trans-1,4-bonds and a content of cis-1,4-bonds when the butadiene part is not hydrogenated. Preferentially, use is especially made of an SBR block having a styrene content for example within a range extending from 10% to 60% by weight, preferably from 20% to 50% by weight, and for the butadiene part, a content of 1,2-bonds within a range extending from 4% to 75% (mol %) and a content of 1,4-bonds within a range extending from 20% to 96% (mol %).

The degree of hydrogenation is determined by an NMR analysis. The spectra are acquired on a Bruker Avance 500 MHz spectrometer equipped with a 1H-X 5 mm Cryoprobe. The quantitative $^1$H NMR experiment uses a simple 30° pulse sequence and a repetition time of 5 seconds between each acquisition. 64 accumulations are carried out. The samples (approximately 25 mg) are dissolved in approximately 1 ml of $CS_2$, 100 μl of deuterated cyclohexane are added for locking during acquisition. The chemical shifts are calibrated relative to the protonated impurity of the $CS_2$ 1H δ ppm at 7.18 ppm, with reference to TMS (1H δ ppm at 0 ppm). The $^1$H NMR spectrum makes it possible to quantify the microstructure by integration of the unresolved peaks of signals characteristic of the different moieties:

The styrene originating from the SBR and the polystyrene blocks. It is quantifiable in the aromatics region between 6.0 ppm and 7.3 ppm for 5 protons (with subtraction of the integral of the signal of the $CS_2$ impurity at 7.18 ppm).

The PB1-2 originating from the SBR. It is quantifiable in the ethylenics region between 4.6 ppm and 5.1 ppm for 2 protons.

The PB1-4 originating from the SBR. It is quantifiable in the ethylenics region between 5.1 ppm and 6.1 ppm for 2 protons and with deletion of 1 proton of the PB1-2 unit.

The hydrogenated PB1-2 originating from the hydrogenation and only exhibiting aliphatic protons. The pendent $CH_3$s of the hydrogenated PB1-2 were identified and are quantifiable in the aliphatics region between 0.4 and 0.8 ppm for 3 protons.

The hydrogenated PB1-4 originating from the hydrogenation and only exhibiting aliphatic protons. It will be deduced by subtracting the aliphatic protons of the various moieties, considering it for 8 protons.

The microstructure can be quantified in mol % as follows: mol % of a unit=$^1$H integral of a unit/Σ($^1$H integrals of each unit). For example, for a styrene unit: mol % of styrene=($^1$H integral of styrene)/($^1$H integral of styrene+$^1$H integral of PB1-2+$^1$H integral of PB1-4+$^1$H integral of hydrogenated PB1-2+$^1$H integral of hydrogenated PB1-4).

Preferably, in the thermoplastic elastomers of use for the requirements of the invention, the SBR elastomer block is hydrogenated such that a proportion ranging from 10 mol % to 50 mol % of the double bonds in the butadiene portion are hydrogenated.

Preferably for the invention, the elastomer blocks of the thermoplastic elastomers have a number-average molecular weight (Mn) ranging from 25 000 g/mol to 350 000 g/mol, preferably from 35 000 g/mol to 250 000 g/mol, so as to confer, on the thermoplastic elastomers, good elastomeric properties and a mechanical strength which is sufficient and compatible with the use as a tyre outer sidewall.

Particularly preferably in the invention, the unsaturated elastomer block(s) are selected from the group consisting of polyisoprenes, polybutadienes, styrene/butadiene copolymers, and mixtures of these elastomers, these elastomers being non-hydrogenated or partially hydrogenated.

As previously explained, the thermoplastic elastomers that can be used according to the invention comprise at least one thermoplastic block.

The term "thermoplastic block" is intended to mean a block consisting of polymerized monomers and having a glass transition temperature, or a melting point in the case of semicrystalline polymers, above or equal to 80° C., preferably varying from 80° C. to 250° C., more preferentially varying from 80° C. to 200° C., and in particular varying from 80° C. to 180° C.

Indeed, in the case of a semicrystalline polymer, a melting point may be observed which is above the glass transition temperature. In this case, the melting point and not the glass transition temperature is taken into account for the definition above.

The thermoplastic block(s) may be formed from polymerized monomers of various types.

In particular, the thermoplastic block(s) can be selected from the group consisting of polyolefins (polyethylene, polypropylene), polyurethanes, polyamides, polyesters, polyacetals, polyethers (polyethylene oxide, polyphenylene ether), polyphenylene sulfides, polyfluorinated compounds (FEP, PFA, ETFE), polystyrenes, polycarbonates, polysulfones, poly(methyl methacrylate), polyetherimide, thermoplastic copolymers such as the acrylonitrile/butadiene/styrene copolymer (ABS), and mixtures of these polymers.

The thermoplastic block(s) may also be obtained from monomers selected from:
  acenaphthylene: those skilled in the art may refer, for example, to the paper by Z. Fodor and J. P. Kennedy, Polymer Bulletin, 1992, 29(6), 697-705;
  indene and its derivatives, such as, for example, 2-methylindene, 3-methylindene, 4-methylindene, dimethylindenes, 2-phenylindene, 3-phenylindene and 4-phenylindene; those skilled in the art may, for example, refer to the patent document U.S. Pat. No. 4,946,899, by the inventors Kennedy, Puskas, Kaszas and Hager, and to the documents J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;
  isoprene, then resulting in the formation of a certain number of trans-1,4-polyisoprene units and of units cyclized according to an intramolecular process; those skilled in the art may, for example, refer to the documents G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

According to one variant of the invention, the above monomers may be copolymerized with at least one other monomer as long as this other monomer does not modify the thermoplastic nature of the block, that is to say that the block has a glass transition temperature, or a melting point in the case of semi-crystalline polymers, above or equal to 80° C.

By way of illustration, this other monomer capable of copolymerizing with the polymerized monomer can be selected from diene monomers, more particularly conjugated diene monomers having from 4 to 14 carbon atoms, and monomers of vinylaromatic type having from 8 to 20 carbon atoms, such as defined in the part relating to the elastomer block.

The thermoplastic block(s) may be selected from polystyrenes and polymers comprising at least one polystyrene block.

Regarding the polystyrenes, these are obtained from styrene monomers.

Styrene monomer should be understood as meaning, in the present description, any monomer comprising styrene, unsubstituted or substituted; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrenes), fluorostyrenes (for example, o-fluorostyrene, m-fluorostyrene, p-fluorostyrene, 2,4-difluorostyrene, 2,6-difluorostyrene or 2,4,6-trifluorostyrenes) or else para-hydroxystyrene.

According to a preferential embodiment of the invention, the content by weight of styrene in the thermoplastic elastomers that can be used according to the invention is between 5% and 50%, preferentially between 10% and 40%.

The proportion of thermoplastic blocks in the thermoplastic elastomers that can be used according to the invention is determined, on the one hand, by the thermoplasticity properties that the thermoplastic elastomers must have.

The thermoplastic block(s) are preferentially present in sufficient proportions to preserve the thermoplastic nature of the thermoplastic elastomers that can be used according to the invention. The minimum content of thermoplastic blocks in the thermoplastic elastomers may vary as a function of the conditions of use of the thermoplastic elastomers.

On the other hand, the ability of the thermoplastic elastomers to deform during the preparation of the tyre can also contribute to determining the proportion of the thermoplastic blocks in the thermoplastic elastomers that can be used according to the invention.

Preferably, the thermoplastic blocks of the thermoplastic elastomers have a number-average molecular weight (Mn) ranging from 5000 g/mol to 150 000 g/mol, so as to confer, on the thermoplastic elastomers, good elastomeric properties and a mechanical strength which is sufficient and compatible with the use as a tyre outer sidewall.

Particularly preferably in the invention, the thermoplastic block(s) are selected from the group consisting of polystyrenes, polyesters, polyamides, polyurethanes, and mixtures of these polymers.

Very particularly preferably in the invention, the thermoplastic block(s) are selected from the group consisting of polystyrenes, polyesters, polyamides, and mixtures of these polymers.

Preferably in the invention, the thermoplastic elastomer(s) are selected from the group consisting of styrene/butadiene/styrene (SBS) block copolymers, styrene/isoprene/styrene (SIS) block copolymers, styrene/optionally partially hydrogenated butadiene-styrene copolymer/styrene (SOE) block copolymers, and mixtures of these copolymers.

More preferentially, the thermoplastic elastomer(s) are selected from the group consisting of styrene/butadiene/styrene (SBS) block copolymers, styrene/optionally partially hydrogenated butadiene-styrene/styrene (SOE) block copolymers, and mixtures of these copolymers.

According to another variant, the thermoplastic elastomer(s) are selected from the group consisting of styrene/butadiene/styrene (SBS) block copolymers, styrene/isoprene/styrene (SIS) block copolymers, styrene/partially hydrogenated butadiene-styrene copolymer/styrene (SOE) block copolymers, and mixtures of these copolymers.

Particularly preferably, the thermoplastic elastomer(s) are selected from the group consisting of styrene/butadiene/styrene (SBS) block copolymers, styrene/partially hydrogenated butadiene-styrene copolymer/styrene (SOE) block copolymers, and mixtures of these copolymers.

By way of examples of commercially available thermoplastic elastomers that can be used according to the invention, mention may be made of the elastomers of SIS type sold by Kuraray under the name Hybrar 5125 or sold by Kraton under the name D 1161, or else the elastomers of linear SBS type sold by Polimeri Europa under the name Europrene SOL T 166 or of star-branched SBS type sold by Kraton under the name D1184. Mention may also be made of the elastomers sold by Dexco Polymers under the name Vector (for example Vector 4114 or Vector 8508).

Preferably, the content of thermoplastic elastomer(s) comprising at least one elastomer block and at least one thermoplastic block, the elastomer block(s) not denoting one or more polyisobutylene block(s), in the composition ranges from 1 to 50 phr, preferably from 5 to 45 phr, more preferentially from 10 to 40 phr, even more preferentially from 15 to 35 phr.

Particularly preferably, the thermoplastic elastomer(s) comprising at least one elastomer block and at least one thermoplastic block, the elastomer(s) not denoting one or more polyisobutylene block(s), are the only thermoplastic elastomers of the elastomeric matrix.

It is also possible for the thermoplastic elastomers that can be used according to the invention to be in a mixture with other non-thermoplastic elastomers.

As previously explained, the elastomeric matrix that can be used according to the invention comprises one or more synthetic diene elastomers selected from butadiene polymers having a glass transition temperature of less than or equal to −50° C.

The term "synthetic diene elastomer" should be understood, in a known manner, to mean a synthetic elastomer resulting at least in part, that is to say a homopolymer or a copolymer, from synthetic diene monomers.

In a way known per se, a diene monomer is a monomer comprising two conjugated or non-conjugated carbon-carbon double bonds.

Thus, the expression "synthetic diene elastomers selected from butadiene polymers" should be understood to mean a synthetic elastomer resulting, at least in part, that is to say a homopolymer or a copolymer, from butadiene monomers.

Preferably, the synthetic diene elastomer(s) selected from butadiene polymers having a glass transition temperature of less than or equal to −50° C. are selected from homopolymers obtained by polymerization of a butadiene monomer, copolymers obtained by copolymerization of one or more conjugated diene monomers, at least one of which is a butadiene monomer, with one another or with one or more vinylaromatic compounds having from 8 to 20 carbon atoms, and mixtures of these polymers.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene.

The following, for example, are suitable as vinylaromatic compounds: styrene, ortho-, meta- or para-methylstyrene, the "vinyltoluene" commercial mixture, para-(tert-butyl) styrene, methoxy styrenes, chlorostyrenes, vinylmesitylene, divinylbenzene or vinylnaphthalene.

When the synthetic diene elastomer(s) selected from butadiene polymers having a glass transition temperature of less than or equal to −50° C. are selected from copolymers obtained by copolymerization of one or more conjugated dienes, at least one of which is a butadiene monomer, with one another or with one or more vinylaromatic compounds having from 8 to 20 carbon atoms, these can contain between 99% and 20% by weight of butadiene units and between 1% and 80% by weight of vinylaromatic units.

The synthetic diene elastomers that can be used according to the invention can have any microstructure, which depends on the polymerization conditions used, in particular on the presence or absence of a modifying and/or randomizing agent and on the amounts of modifying and/or randomizing agent employed.

The synthetic diene elastomers that can be used according to the invention can, for example, be prepared in dispersion or in solution; they can be coupled and/or star-branched or else functionalized with a coupling and/or star-branching or functionalization agent. For coupling with carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973).

Mention may also be made, as other examples of functionalized elastomers, of elastomers (such as SBR or BR) of the epoxidized type.

Suitable synthetic diene elastomers that can be used in the composition of the outer sidewall of the tyre according to the invention are in particular polybutadienes having a content (mol %) of 1,2-units of between 4% and 80% or those having a content (mol %) of cis-1,4-units of greater than 80%, butadiene/styrene copolymers and in particular those having a glass transition temperature, Tg, (measured according to ASTM D3418) of between −50° C. and −70° C. and more particularly between −50° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and in particular those having an isoprene content of between 5% and 90% by weight and a Tg of −50° C. to −80° C. In the case of butadiene/styrene/isoprene copolymers, suitable in particular are those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −50° C. and −70° C.

Particularly preferably, the synthetic diene elastomer(s) are selected from the group consisting of polybutadienes (abbreviated to BRs), butadiene copolymers, preferably butadiene/styrene copolymers (SBRs), isoprene/butadiene copolymers (BIRs) and isoprene/butadiene/styrene copolymers (SBIRs), and mixtures of these copolymers.

Preferably, the content of synthetic diene elastomers in the composition that can be used in the tyre sidewall according to the invention ranges from 50 to 99 phr, preferably from 55 to 95 phr, more preferentially from 60 to 90 phr, and even more preferentially from 65 to 90 phr.

As stated above, the composition of the outer sidewall that can be used in the tyre according to the invention also comprises a crosslinking system.

Preferably, the crosslinking system is based on sulfur or a sulfur donor.

The expression "crosslinking system based on" should be understood to mean that the crosslinking system comprises a mixture and/or the product of the reaction of the various constituents used in the crosslinking system, and in particular the sulfur or the sulfur donor, some of these basic constituents being capable of, or intended to, react, at least in part, with one another or with the other constituents of the tyre sidewall composition during the various phases of manufacture of the tyre sidewall composition.

The crosslinking system can be a vulcanization system. In this case, it is preferably based on sulfur or based on a sulfur donor and on a vulcanization accelerator, in particular a primary vulcanization accelerator.

Mention may be made, among sulfur donors, for example, of alkylphenol disulfides (APDSs), such as, for example, para-(tert-butyl)phenol disulfide.

Advantageously, the content of sulfur or sulfur donor is between 0.5 and 2 phr, preferably between 0.5 and 1.5 phr, more preferably between 0.5 and 1.4 phr.

Use may be made, as primary accelerator, of any compound capable of acting as accelerator for the vulcanization of diene elastomers in the presence of sulfur, in particular accelerators of the thiazole type, and also derivatives thereof, or accelerators of thiuram or zinc dithiocarbamate type. These accelerators are more preferably selected from the group consisting of N-cyclohexyl-2-benzothiazolesulfenamide (abbreviated to "CBS"), N,N-dicyclohexyl-2-benzothiazolesulfenamide (abbreviated to "DCB S"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and mixtures of these compounds.

Preferably, use is made of a primary accelerator of the sulfenamide type.

Particularly preferably, the primary vulcanization accelerator is N-cyclohexyl-2-benzothiazylsulfenamide (CBS).

According to one particular embodiment of the invention, the content of vulcanization accelerator(s) ranges from 0.2 to 10 phr, preferably ranges from 0.2 to 7 phr, more preferentially from 0.6 to 2 phr.

Advantageously, the sulfur or sulfur donor/vulcanization accelerator weight ratio ranges from 0.8 to 1.2.

Additional to this vulcanization system are optionally various known secondary vulcanization accelerators or vulcanization activators, such as zinc oxide, stearic acid, guanidine derivatives (in particular diphenylguanidine), etc.

As mentioned above, the composition that can be used in the outer sidewall of the tyre according to the invention comprises one or more reinforcing fillers.

In particular, use may be made of any type of filler commonly used for the manufacture of tyres, for example an organic filler, such as carbon black, an inorganic filler, such as silica, or else a blend of these two types of filler, especially a blend of carbon black and silica.

Preferably, the reinforcing filler(s) is (are) carbon black and/or silica and preferably the reinforcing filler is carbon black.

All the carbon blacks conventionally used in tyres ("tyre-grade" blacks) are suitable as carbon blacks. Mention will more particularly be made, for example, of the reinforcing carbon blacks of the 100, 200 or 300 series (ASTI grades) or the 500 series, such as, for example, the N115, N134, N234, N326, N330, N339, N347, N375 or N500 blacks, or else, depending on the applications targeted, the blacks of higher series (for example N660, N683 or N772), indeed even N990.

The term "reinforcing inorganic filler" should be understood, in the present patent application, by definition, to mean any inorganic or mineral filler, whatever its colour and its origin (natural or synthetic), also referred to as "white filler", "clear filler", indeed even "non-black filler", in contrast to carbon black, capable of reinforcing, by itself alone, without means other than an intermediate coupling agent, a composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to those skilled in the art, in particular any precipitated or fumed silica exhibiting a BET surface and also a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

Advantageously, the content of reinforcing filler(s) ranges from 5 to 60 phr.

Particularly preferably, the content of reinforcing filler(s) ranges from 5 to 30 phr.

In this preferential embodiment, the tyre has a low hysteresis while at the same time maintaining good rigidity properties.

According to one preferential embodiment of the invention, the composition used in the outer sidewall of the tyre according to the invention may also comprise at least one plasticizing agent, such as an oil (or a plasticizing oil or extender oil), or a plasticizing resin, the role of which is to facilitate the processing of the outer sidewall, in particular its incorporation into the pneumatic object, by lowering the modulus and increasing the tackifying power.

Use may be made of any type of plasticizer which can be a resin or an extender oil. The designation "resin" is reserved in the present patent application, by definition known to those skilled in the art, for a compound which is solid at ambient temperature (23° C.), in contrast to a liquid plasticizing compound, such as an extender oil or a plasticizing oil. At ambient temperature (23° C.), these oils, which are more or less viscous, are liquid (that is to say, as a reminder, substances which have the ability to eventually assume the shape of their container), in contrast especially to resins or rubbers, which are by nature solid.

Hydrocarbon resins are polymers well known to those skilled in the art, essentially based on carbon and hydrogen, that can be used in particular as plasticizing agents in elastomeric compositions. They have been described, for example, in the work entitled "Hydrocarbon Resins" by R. Mildenberg, M. Zander and G. Collin (New York, V C H, 1997, ISBN 3-527-28617-9), Chapter 5 of which is devoted to their applications, in particular in the tyre rubber field (5.5. "Rubber Tires and Mechanical Goods"). They may be aliphatic, cycloaliphatic, aromatic, hydrogenated aromatic, or of the aliphatic/aromatic type, that is to say based on aliphatic and/or aromatic monomers. They can be natural or synthetic and are or are not based on petroleum (if such is the case, they are also known under the name of petroleum resins). They are by definition miscible (i.e., compatible) at the contents used with the elastomeric compositions for which they are intended, so as to act as true diluents. Their Tg is preferably greater than 0° C., in particular greater than 20° C. (most often between 30° C. and 120° C.).

In a known way, these hydrocarbon resins can also be described as thermoplastic resins in the sense that they soften when heated and can thus be moulded. They can also be defined by a softening point, the temperature at which the product, for example in the powder form, sticks together. The softening point of a hydrocarbon-based resin is generally greater by approximately 50 to 60° C. than its Tg value.

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and mixtures of these resins. Among the above copolymer resins, mention may be made more particularly of those selected from the group consisting of (D)CPD/vinylaromatic copolymer resins, (D)CPD/terpene copolymer resins, (D)CPD/C5 fraction copolymer resins, (D)CPD/C5 fraction copolymer resins, (D)CPD/C9 fraction copolymer resins, terpene/vinylaromatic copolymer resins, terpene/phenol copolymer resins, C5 fraction/vinylaromatic copolymer resins and mixtures of these resins.

The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomer are, for example: styrene, α-methylstyrene, ortho-methylstyrene, meta-methylstyrene, para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and mixtures of these resins.

All the above resins are well known to those skilled in the art and are commercially available, for example sold by DRT under the name Dercolyte as regards polylimonene resins, by Neville Chemical Company under the name Super Nevtac, by Kolon under the name Hikorez or by Exxon Mobil under the name Escorez as regards $C_5$ fraction/styrene resins or $C_5$ fraction/$C_9$ fraction resins, or by Struktol under the name 40 MS or 40 NS (mixtures of aromatic and/or aliphatic resins).

Preferably, the extender oil is selected from the group consisting of polyolefinic oils (that is to say oils, resulting from the polymerization of monoolefinic or diolefinic olefins), paraffinic oils, naphthenic oils (of low or high viscosity), aromatic oils, mineral oils and mixtures of these oils.

The number-average molecular weight (Mn) of the extender oil is preferentially between 200 and 25 000 g/mol, more preferentially still between 300 and 10 000 g/mol. For excessively low Mn weights, there is a risk of the oil migrating outside the composition, whereas excessively high weights can result in excessive stiffening of this composition. An Mn weight of between 350 and 4000 g/mol, in particular between 400 and 3000 g/mol, has proved to constitute an excellent compromise for the targeted applications, in particular for use in a tyre outer sidewall.

The number-average molecular weight (Mn) of the extender oil is determined by size exclusion chromatography (SEC), the sample being dissolved beforehand in tetrahydrofuran at a concentration of approximately 1 g/l; the solution is then filtered through a filter with a porosity of 0.45 μm before injection. The apparatus is the Waters Alliance chromatographic line. The elution solvent is tetrahydrofuran, the flow rate is 1 ml/min, the temperature of the system is 35° C. and the analysis time is 30 min. A set of two Waters columns with the Styragel HT6E name is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

When it is used, it is preferable for the content of plasticizer to vary from 2 to 60 phr, preferentially from 3 to 50 phr, even more preferentially from 3 to 15 phr. Below the minimum indicated, the presence of plasticizer is not perceptible. Above the recommended maximum, the risk is encountered of insufficient cohesion of the composition.

The composition that can be used in the outer sidewall of the tyre according to the invention can also comprise a platy filler.

The optional use of platy filler advantageously makes it possible to lower the coefficient of permeability (and thus to increase the airtightness) of the composition, without excessively increasing its modulus, which makes it possible to retain the ease of incorporation of the outer sidewall in the pneumatic object.

"Platy" fillers are well known to those skilled in the art. They have been used in particular in tyres in order to reduce the permeability of conventional airtight layers based on butyl rubber. They are generally used at relatively low contents, generally not exceeding 1 to 50 phr, or contents by volume which can vary in particular from 0.1% to 25% by volume of elastomeric composition and preferably from 1% to 20% by volume.

They are generally provided in the form of stacked plates, platelets, sheets or lamellae, with a more or less marked anisometry. Their aspect ratio (A=L/T) is generally greater than 3, more often greater than 5 or than 10, L representing the length (or greatest dimension) and T representing the mean thickness of these platy fillers, these means being calculated on a number basis. Aspect ratios reaching several tens, indeed even several hundreds, are frequent. Their mean length is preferably greater than 1 μm (that is to say that "micrometric" platy fillers are then involved), typically of between a few μm (for example 5 μm) and a few hundred μm (for example 500 μm, indeed even 800 μm).

Preferably, the platy fillers used in accordance with the invention are selected from the group consisting of graphites, silicon-based platy mineral fillers and mixtures of such fillers.

Graphite is understood to mean, generally, an assembly of non-compact hexagonal lamellae of carbon atoms: graphenes. Graphite, a hexagonal crystalline system, exhibits a stack of ABAB type, where the B plane is translated relative to the A plane.

Graphite cannot be regarded as a reinforcing filler; however, it can be regarded as a semi-reinforcing (or partially reinforcing) filler in so far as it makes possible an increase in the tensile modulus of an elastomeric composition in which it is incorporated.

Given these definitions, graphite capable of being used in the compositions that can be used according to the invention is understood more particularly to mean:

(a) any natural graphite, associated with rocks affected by metamorphism, after separation of the impurities accompanying the graphite veins and after milling;

(b) any thermally expandable natural graphite, i.e. in which one or more chemical compounds in the liquid state, for example an acid, is intercalated between its graphene planes;

(c) any expanded natural graphite, the latter being produced in two steps: intercalation of one or more chemical compounds in the liquid state, for example an acid, between the graphene planes of a natural graphite by chemical treatment and high-temperature expansion;

(d) any synthetic graphite obtained by graphitization of petroleum coke.

The composition that can be used in the outer sidewall of the tyre according to the invention can contain just one graphite or a mixture of several graphites; thus, it is possible to have a blend of natural graphite and/or of expanded graphite and/or of synthetic graphite.

The graphite as defined above can be provided morphologically in lamellar or non-lamellar form and will in both cases be categorized as a platy filler within the meaning of the present invention.

It has been found, surprisingly, that graphites with either of these two types of morphology are suitable in the composition that can be used according to the invention; however, graphites exhibiting a lamellar form are preferably suitable, all the more so when they are oriented so as to present their largest face perpendicular to the gas permeation stream.

When it is used, the graphite is present in the elastomeric composition at contents ranging from 1 phr to 60 phr and preferably between 5 phr and 30 phr.

Suitable in particular among silicon-based platy mineral fillers are phyllosilicates and particularly those included in the group consisting of smectites, kaolin, talc, mica and vermiculite.

Also suitable for the invention among phyllosilicates are functionalized phyllosilicates and in particular organomodified phyllosilicates. According to a specific embodiment, the organic structure with which the inert filler is combined is a surfactant of formula: $-M^+R^3R^4R^5$; where M represents a nitrogen, sulfur, phosphorus or pyridine atom and where $R^3$, $R^4$ and $R^5$ represent a hydrogen atom, an alkyl group, an aryl group or an allyl group, $R^3$, $R^4$ and $R^5$ being identical or different.

In particular, organomodified montmorillonites are suitable for the invention. Thus, montmorillonites modified with a surfactant, such as a dihydrogenated dioctadecyldimethyl quaternary ammonium salt. Such an organomodified montmorillonite is commercially available, in particular from Southern Clay Products under the trade names: Cloisite 6A and 20A.

Other surfactants based on quaternary ammonium salts can also be used to modify phyllosilicates, such as are described in Patent Application WO06/047509.

Mention may be made, as examples of micas, of the micas sold by CMMP (Mica-MU®, Mica-Soft®, Briomica®, for example), those sold by Yamaguchi (A51S, A41S, SYA-21R, SYA-21RS, A21S, SYA-41R), vermiculites (in particular the Shawatec® vermiculite sold by CMMP or the Microlite® vermiculite sold by W. R. Grace), or modified or treated micas (for example, the Iriodin® range sold by Merck). Mention may be made, as examples of graphites, of the graphites sold by Timcal (Timrex® range). Mention may be made, as examples of talcs, of the talcs sold by Luzenac.

The abovementioned inert fillers, other than graphite, are in fact particularly advantageous as they make it possible to improve the impermeability of the compositions in which they are dispersed with an appropriate content. For example, when they are used, their content can vary from 1 phr to 80 phr and preferably from 3 phr to 40 phr.

The introduction of the platy fillers into the composition can be carried out according to various known processes, for example by mixing in solution, by mixing in bulk in an internal mixer, or also by mixing by extrusion.

The composition that can be used for the outer sidewall of the tyre according to the invention can furthermore comprise the various additives normally present in the outer sidewalls known to those skilled in the art. Mention will be made, for example, of non-reinforcing or inert fillers other than the platy fillers described above, plasticizers other than the abovementioned extender oils, UV inhibitors, various processing aids or other stabilizing agents, or also promoters capable of favouring the adhesion to the remainder of the structure of the pneumatic object.

Another subject of the invention is a process for producing a composition for the manufacture of tyres as defined above, comprising the following steps:
incorporating the reinforcing filler(s) into the elastomeric matrix during a first step, everything being kneaded thermomechanically, in one or more goes, until a maximum temperature Ti of between 110° C. and 190° C. is reached, then
subsequently incorporating the crosslinking system, during a second step, and kneading everything up to a maximum temperature of less than 90° C.

Preferably, the first step is carried out in an internal mixer and the second step is carried out in an external mixer.

Thus, subsequent to the first step, the mixture is generally subjected to several passes between two rollers, the temperature of which is controlled, that is to say lower than the temperature for triggering the vulcanization. The temperature of this step is generally less than 90° C.

The final composition thus obtained can subsequently be calendered, for example in the form of a sheet or of a plate or also extruded, in order to form an outer sidewall profiled element that can be used in the tyre according to the invention.

Measurement Method

Depth of Grooves

In order to measure the depth of grooves, use is made of a tyre sidewall test specimen with a square section (side 15 cm) and with a thickness of 9 mm obtained by moulding. The curing of the test specimens is carried out under a pressure of 16 bar at 170° C. for 15 minutes. The test specimen is fitted to the bed of a machine-tool. A cone made of hard steel with a length of 7 mm, the angle at the vertex of which is 75°, is attached to the tool holder of the machine. To produce the cones, the radius of curvature at the end is specified at less than 0.1 mm. The cones are cleaned before use. The cone, from the point of first contact (indentation), sinks in by 5 mm. After the desired sinking in has been obtained, the cone is moved parallel to the mixture plate, at a rate of 30 mm per second. The appearance of the scratches which appear at the rear of the cone subsequent to the tearing of the mixture is recorded at a sufficient distance, of the order of a centimetre, from the first point at which the cone was sunk into the mixture, so that the scratch observed is not affected by a possible transitory phenomenon and becomes independent of the length slid over.

In order to compare the sidewall that can be used according to the invention with the control sidewall, a confocal microscope is used to measure the depth of the scratches. Each measurement by confocal microscopy is carried out at three different points (two on the rubber close to the scratch and one at the bottom of the scratch), where the latter is sufficiently open for the measurement to be able to be carried out.

This measurement of the scratch depth is carried out at ten different sites of the scratch and then the mean of the ten depth measurements is calculated. For greater readability, the results will be shown in base 100 (percentage), the value 100 being assigned to the control. A result greater than 100 indicates a decrease in the value in question.

Thus, a percentage greater than 100% means that the scratch is not as deep as that of the reference tyre sidewall.

Dynamic Properties (Dynamic Shear Modulus (G*) and Loss Modulus (G"))

The dynamic properties G* and G" are measured on a viscoanalyzer (Metravib V A4000), according to standard ASTM D 5992-96. The response of a sample of desired vulcanized composition (cylindrical test specimen with a thickness of 2 mm and a cross section of 78.5 mm$^2$), subjected to a simple alternating sinusoidal shear stress, at a frequency of 10 Hz and at a temperature of 23° C. and according to Standard ASTM D 1349-99, is recorded. A peak-to-peak strain amplitude sweep is carried out from 0.1% to 50% (outward cycle) and then from 50% to 1% (return cycle). The results utilized are the complex dynamic shear modulus (G*) and the loss modulus (G"). For the return cycle, the value of G* at 20% strain and also the value of G" at 20% strain are recorded. For greater readability, the results will be shown in base 100 (percentage), the value 100 being assigned to the control. A result of less than 100 indicates an increase in the value in question and, conversely, a result of greater than 100 will indicate a decrease in the value in question.

In other words, if the loss modulus G" decreases, then the percentage relative to G" increases. In this case, the hysteresis decreases and is thus improved.

Likewise, if the complex dynamic shear modulus G* decreases, then the percentage relative to G* increases. The rigidity is in this case improved.

Ozone Test Developed in the Laboratory

In order to measure the ozone resistance of the materials, several test-specimen strips are tensioned at various strains ranging from 10% strain to 100% strain in increments of 10% starting from 10% strain, then in increments of 5% starting from 50% strain. After 240 hours of exposure to a temperature of 38° C. and an ozone content of 40 ppm, the maximum extension value for which the test specimen did not break is taken into account. This enables the materials to be categorized.

EXAMPLES

1) Preparation of the Compositions

An composition that can be used in a comparative tyre (composition A) and four compositions that can be used in a tyre according to the invention (compositions B, C, D and E) were prepared using the ingredients and the contents in Table I below. The contents are expressed in phr.

TABLE I

| Ingredients | A (Comp.) | B (Inv.) | C (Inv.) | D (Inv.) | E (Inv.) |
|---|---|---|---|---|---|
| Butadiene rubber[1] | 65 | 65 | 65 | 65 | 65 |
| Natural rubber | 35 | — | — | — | — |
| SBS[2] | — | 35 | 35 | 35 | 35 |
| Carbon black[3] | 50 | 50 | 20 | 20 | 20 |
| Oil[4] | 15 | 15 | 15 | 15 | 15 |
| Antioxidant 1[5] | 1.5 | 1.5 | 1.5 | 1.5 | 1.5 |
| Antioxidant 2[6] | 1.5 | 1.5 | 1.5 | 1.5 | — |
| Ozone wax | 1 | 1 | 1 | 1 | 1 |
| Stearic acid | 1 | 1 | 1 | 1 | 1 |
| Zinc oxide | 2.4 | 2.4 | 2.4 | 2.4 | 2.4 |
| Sulfur | 1.4 | 1.4 | 1.4 | 0.8 | 1.2 |
| Vulcanization accelerator[7] | 1.4 | 1.4 | 1.4 | 0.8 | 1.2 |

[1]BR ND ML63,
[2]Block copolymer comprising 31% by weight of styrene of the D1101 series from the company Kraton,
[3]Carbon black of the N550 series from the company Cabot,
[4]"Catenex SNR" MES oil from the company Shell,
[5]"Santoflex 6PPD" antioxidant from the company Solutia,
[6]"Vulkanox IPPD" antioxidant from the company Bayer,
[7]"Santocure CBS" accelerator from the company Solutia.

2) Preparation of the Test Specimens of Outer Sidewall that can be Used in the Tyres According to the Invention The outer sidewall compositions are prepared in appropriate mixers, using two successive phases of preparation according to a general procedure well known to those skilled in the art: a first phase of thermomechanical working or kneading (sometimes referred to as "non-productive" phase) at high temperature, up to a maximum temperature of 140° C., followed by a second phase of mechanical working (sometimes referred to as "productive" phase) at a lower temperature of 40° C., during which finishing phase the crosslinking system is incorporated.

In this instance, the processing of the elastomeric compositions is carried out by means of a mixer of the Haake RM 3000 type of 360 cm$^3$ with blades of CAM type.

The preparation of the outer sidewall test specimens is carried out in an internal mixer.

After cooling the mixture thus obtained during the first non-productive phase, the crosslinking system is then incorporated at 40° C., in an external open mill; everything is then mixed (productive phase) for a few minutes, for example between 2 and 15 min, in this instance 10 minutes.

The tyre outer sidewall test specimen comprising composition A is called sidewall A. The tyre outer sidewall test specimens comprising, respectively, compositions B, C, D and E are called, respectively, sidewalls B, C, D and E.

3) Results

The results are collated in Table II below. It should be noted that the moduli G" and G* of sidewall B were not measured, and that the groove depth of sidewall E was not measured.

TABLE II

| Sidewall | A (Comp.) | B (Inv.) | C (Inv.) | D (Inv.) | E (Inv) |
|---|---|---|---|---|---|
| Groove (%) | 100 | 132 | 216 | 271 | — |
| Modulus G" (%) | 100 | — | 114 | 158 | 154 |
| Modulus G* (%) | 100 | — | 101 | 96 | 114 |
| Maximum value of extension (%) | 15 | — | — | 35 | 15 |

It can be noted that the tyres according to the invention which have the sidewalls B, C and D exhibit an improved resistance to attack compared with the reference tyre which has the sidewall A. In addition, the tyres according to the invention which have the sidewalls C, D and E exhibit a decrease in hysteresis compared with the reference tyre, while at the same time allowing dynamic properties (the rigidity G*) in accordance with a use in tyres.

Furthermore, the tyre which has the sidewall D exhibits an improved ozone resistance compared with the reference tyre which has the sidewall A.

Moreover, it is valuable to note that the tyre which has the sidewall E exhibits an ozone resistance equivalent to that of the reference tyre which has the sidewall A, although the total content of antioxidant in the sidewall E is less than that in the sidewall A. The blooming phenomenon is thus minimized.

This equivalent ozone resistance is all the more advantageous since the hysteresis and the dynamic properties are in accordance with a use in tyres.

The invention claimed is:

1. A tire having an outer sidewall, the outer sidewall comprising:
    at least one composition based on an elastomeric matrix comprising:
        at least one thermoplastic elastomer comprising at least one elastomer block and at least one thermoplastic block, the at least one elastomer block not denoting a polyisobutylene block,
        wherein the at least one thermoplastic elastomer is selected from the group consisting of styrene/butadiene/styrene (SBS) block copolymers, styrene/isoprene/styrene (SIS) block copolymers, styrene/partially hydrogenated butadiene-styrene copolymer/styrene (SOE) block copolymers, and mixtures thereof, and
        wherein a content by weight of styrene in the at least one thermoplastic elastomer is between 10% and 40%; and
        at least one synthetic diene elastomer selected from the group consisting of polybutadienes having a glass transition temperature of less than or equal to −50° C.;
    at least one crosslinking system; and
    at least one reinforcing filler.

2. The tire according to claim 1, wherein the at least one elastomer block has a glass transition temperature of less than or equal to −50° C.

3. The tire according to claim 1, wherein the at least one elastomer block comprises at least one unsaturated elastomer block.

4. The tire according to claim 1, wherein the at least one thermoplastic elastomer is selected from the group consisting of styrene/butadiene/styrene (SBS) block copolymers, styrene/partially hydrogenated butadiene-styrene copolymer/styrene (SOE) block copolymers, and mixtures thereof.

5. The tire according to claim 1, wherein a content of the at least one thermoplastic elastomer ranges from 1 to 50 phr.

6. The tire according to claim 1, wherein a content of the at least one synthetic diene elastomer ranges from 50 to 99 phr.

7. The tire according to claim 1, wherein the crosslinking system is based on sulfur or a sulfur donor.

8. The tire according to claim 7, wherein a content of sulfur or sulfur donor is between 0.5 and 2 phr.

9. The tire according to claim 1, wherein the crosslinking system comprises at least one vulcanization accelerator, and a content of the at least one vulcanization accelerator ranges from 0.2 to 10 phr.

10. The tire according to claim 1, wherein the at least one reinforcing filler is carbon black, silica, or a mixture of carbon black and silica.

11. The tire according to claim 1, wherein a content of the at least one reinforcing filler ranges from 5 to 60 phr.

12. The tire according to claim 1, wherein the at least one thermoplastic elastomer is selected from the group consisting of styrene/butadiene/styrene (SBS) block copolymers, styrene/isoprene/styrene (SIS) block copolymers, and mixtures thereof.

* * * * *